United States Patent
Yu

(10) Patent No.: US 11,330,521 B2
(45) Date of Patent: May 10, 2022

(54) METHOD FOR WAKING UP INTELLIGENT DEVICE IN GROUP WAKE-UP MODE, INTELLIGENT DEVICE AND COMPUTER-READABLE STORAGE MEDIUM

(71) Applicant: Baidu Online Network Technology (Beijing) Co., Ltd., Beijing (CN)

(72) Inventor: Dehong Yu, Beijing (CN)

(73) Assignees: Baidu Online Network Technology (Beijing) Co., Ltd., Beijing (CN); Shanghai Xiaodu Technology Co., Ltd., Shanghai (CN)

( * ) Notice: Subject to any disclaimer, the term of this patent is extended or adjusted under 35 U.S.C. 154(b) by 124 days.

(21) Appl. No.: 16/838,218

(22) Filed: Apr. 2, 2020

(65) Prior Publication Data
US 2021/0084589 A1 Mar. 18, 2021

(30) Foreign Application Priority Data
Sep. 17, 2019 (CN) .......................... 201910877529.4

(51) Int. Cl.
*G06F 1/32* (2019.01)
*H04W 52/02* (2009.01)
(Continued)

(52) U.S. Cl.
CPC ...... *H04W 52/0229* (2013.01); *G06F 1/3209* (2013.01); *G06F 1/3287* (2013.01); *G06F 3/16* (2013.01); *G10L 17/00* (2013.01)

(58) Field of Classification Search
None
See application file for complete search history.

(56) References Cited

U.S. PATENT DOCUMENTS 10,909,983 B1* 2/2021 Peng .................. G10L 15/1815
2016/0104483 A1* 4/2016 Foerster ................. G10L 25/03
704/275
(Continued)

FOREIGN PATENT DOCUMENTS

CN 105247609 A 1/2016
CN 106328132 A 1/2017
(Continued)

OTHER PUBLICATIONS

The first OA of CN application No. 2019108775294 with Translation.
(Continued)

*Primary Examiner* — Danny Chan
(74) *Attorney, Agent, or Firm* — Harness, Dickey & Pierce, P.L.C.

(57) ABSTRACT

The application discloses an intelligent device wake-up method, an intelligent device and a computer-readable storage medium. A specific implementation is: obtaining wake-up voice sent by a user; when determining that a current wake-up mode is a group wake-up mode, recognizing volume information corresponding to obtained wake-up voice, and determining wake-up delay time according to the volume information; when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over. Thus, it can ensure that only one intelligent device responds to the wake-up voice sent out by the user at any time, thereby avoiding the situation that multiple intelligent devices respond at the same time.

16 Claims, 7 Drawing Sheets

(51) Int. Cl.
  *G06F 1/3209*   (2019.01)
  *G06F 1/3287*   (2019.01)
  *G06F 3/16*    (2006.01)
  *G10L 17/00*   (2013.01)

(56) References Cited

U.S. PATENT DOCUMENTS

| | | | |
|---|---|---|---|
| 2016/0217790 A1* | 7/2016 | Sharifi | G10L 15/08 |
| 2018/0051419 A1 | 2/2018 | Ostendorf et al. | |
| 2018/0061419 A1* | 3/2018 | Melendo Casado | G10L 15/22 |
| 2018/0211665 A1* | 7/2018 | Park | G06F 3/167 |
| 2019/0147904 A1* | 5/2019 | Tao | G10L 15/08 |
| | | | 704/231 |
| 2019/0198008 A1 | 6/2019 | Guo et al. | |
| 2019/0341049 A1* | 11/2019 | Cheng | G10L 15/08 |
| 2020/0043490 A1* | 2/2020 | Park | G06F 3/167 |
| 2020/0135194 A1* | 4/2020 | Jeong | G10L 15/22 |
| 2020/0196239 A1* | 6/2020 | Wang | H04W 68/02 |

FOREIGN PATENT DOCUMENTS

| | | |
|---|---|---|
| CN | 108966077 A | 12/2018 |
| CN | 109391528 A | 2/2019 |
| CN | 109920416 A | 6/2019 |
| JP | 2017072857 A | 4/2017 |

OTHER PUBLICATIONS

The Notice of Allowance of JP application No. 2020-028535 with Translation.
The first OA of the parallel JP application with Translation.

* cited by examiner

METHOD FOR WAKING UP INTELLIGENT DEVICE IN GROUP WAKE-UP MODE, INTELLIGENT DEVICE AND COMPUTER-READABLE STORAGE MEDIUM

CROSS-REFERENCE TO RELATED APPLICATION

This application claims priority to Chinese Patent Application No. 201910877529.4, filed on Sep. 17, 2019, which is hereby incorporated by reference in its entirety.

TECHNICAL FIELD

The application relates to the field of data processing and, in particular, to a technology for waking up an intelligent device.

BACKGROUND

With the development of science and technology, more and more intelligent devices are gradually entering the life of users. The intelligent device can be equipped with an artificial intelligence operating system, and thus it can respond to the user's wake-up, execute the control instructions sent by the user, and interact with the user.

In order to facilitate the user's control of the intelligent device, the intelligent device can obtain the voice signal sent out by the user. When the voice signal is a preset wake-up instruction, the intelligent device sends the response information according to the voice signal.

At present, multiple intelligent devices may be set in one area at the same time. In case that the distance between multiple intelligent devices is small and the same wake-up instruction is set, when the user sends out a wake-up instruction, multiple intelligent devices in the preset area may respond to the wake-up instruction at the same time. When multiple intelligent devices respond to a wake-up instruction together, on the one hand, the multiple intelligent devices will affect each other during the execution of the instruction, and on the other hand, a poor user experience will be caused.

SUMMARY

The application provides an intelligent device wake-up method, an intelligent device and a computer-readable storage medium, which are used to solve the problem of the existing intelligent device wake-up methods that multiple intelligent devices in a preset area may simultaneously respond to a wake-up instruction sent out by a user.

In a first aspect, the embodiment of the present application provides an intelligent device wake-up method, which includes:

obtaining wake-up voice sent by the user;

when determining that a current wake-up mode is a group wake-up mode, recognizing volume information corresponding to obtained wake-up voice, and determining wake-up delay time according to the volume information;

when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over.

The intelligent device wake-up method provided in the embodiment, through determining the corresponding wake-up delay time according to the volume information, determining whether to respond to wake-up voice according to the wake-up delay time, can ensure that only one intelligent device responds to the wake-up voice sent out by the user at any time, thereby avoiding the problem of multiple intelligent devices responding at the same time and thus improving the user's experience. In addition, according to the intelligent device wake-up method provided in this embodiment, the intelligent device closer to the user responds faster to wake-up voice of the user, and the intelligent device farther away from the user responds to wake-up voice of the user slower, which is more in line with human conversation habits, and thus improves user's experience.

In a possible design, further including:

obtaining a volume level generation request sent by a terminal device, the volume level generation request includes: a group identifier, quantity information of intelligent device with the group identifier, and an identifier of other intelligent device with the group identifier;

obtaining volume information corresponding to the identifier of the other intelligent device respectively, according to the volume level generation request.

generating a first corresponding relationship between volume and level according to the volume information corresponding to the identifier of the other intelligent device, quantity information of the intelligent device with the group identifier.

The intelligent device wake-up method provided in this embodiment, through obtaining a volume level generation request sent by a terminal device, obtaining volume information corresponding to the identifier of other intelligent device according to the volume level generation request, and generating a first corresponding relationship between volume and level according to the volume information corresponding to the identifier of other intelligent device, can quickly determine the level corresponding to wake-up voice sent out by the user, and thus provide a basis for avoiding the situation that multiple intelligent device respond to the wake-up voice at the same time.

In a possible design, further including:

recognizing voiceprint information corresponding to the obtained wake-up voice;

obtaining volume information corresponding to the identifier of the other intelligent device respectively, according to the volume level generation request, including:

obtaining volume information corresponding to the voiceprint information of intelligent device corresponding to the identifier of the other intelligent device respectively according to the volume level generation request;

where the method further includes:

generating a second corresponding relationship between volume and level according to the volume information corresponding to voiceprint information of the intelligent device corresponding to the identifier of the other intelligent device, quantity information of the intelligent device with the group identifier.

The intelligent device wake-up method provided in this embodiment, through recognizing voiceprint information corresponding to obtained wake-up voice, obtaining volume information corresponding to the voiceprint information of intelligent device corresponding to the identifier of the other intelligent device respectively according to the volume level generation request, and generating a second corresponding relationship between volume and level according to the volume information corresponding to the voiceprint information of the intelligent device corresponding to the identifier of the other intelligent device, and the quantity information of the intelligent device with the group identifier, can quickly determine the corresponding level of wake-up voice sent out by the user, and thus provide a basis for avoiding the situation that multiple intelligent device respond to the wake-up voice at the same time.

In a possible design, further including:

sending the first corresponding relationship between volume and level and the second corresponding relationship between volume and level to the intelligent device corresponding to the identifier of the other intelligent device, so that the other intelligent device performs an update process according to the first corresponding relationship between volume and level or the second corresponding relationship between volume and level.

The intelligent device wake-up method provided by the embodiment, through sending the first corresponding relationship between volume and level or the second corresponding relationship between volume and level to the intelligent device corresponding to the identifier of other intelligent device after generating the first corresponding relationship between volume and level or the second corresponding relationship between volume and level, so that other intelligent device in the group can determine wake-up delay time according to the first corresponding relationship between volume and level or the second corresponding relationship between volume and level, and thus can realize that, when wake-up voice sent by the user is obtained, only one intelligent device responds to the wake-up voice, thereby improving the user's experience.

In a possible design, the determining wake-up delay time according to the volume information, including:

querying the first corresponding relationship between volume and level according to the volume information, and obtaining the level corresponding to the volume information;

determining the wake-up delay time according to the level.

The intelligent device wake-up method provided in the embodiment, through determining the level corresponding to the volume information according to the first corresponding relationship between volume and level, and determining the wake-up delay time according to the level, can quickly and accurately determine the wake-up delay time, and thus provide a basis for avoiding the simultaneous response of multiple intelligent device.

In a possible design, further including:

obtaining the second corresponding relationship between the volume and the level corresponding to voiceprint information according to the voiceprint information;

querying the second corresponding relationship between volume and level according to the volume information, and obtaining the level corresponding to the volume information;

determining the wake-up delay time according to the level.

The intelligent device wake-up method provided in the embodiment, through obtaining the second corresponding relationship between volume and level according to the voice voiceprint information, determining the corresponding level of the volume information according to the second corresponding relationship between volume and level, and determining the wake-up delay time according to the level, can quickly and accurately determine the wake-up delay time, and thus provide a basis to avoid the simultaneous response of multiple intelligent device.

In a possible design, the determining the wake-up delay time according to the level, including:

obtaining the wake-up delay time T according to the level through following formula:

$$T=\text{level}*(K+D)$$

where, K represents internal voice processing delay of device, and D represents voice transmission time.

The intelligent device wake-up method provided by the embodiment, can quickly and accurately determine wake-up delay time of the wake-up voice currently sent by the user through the above formula and level.

In a possible design, if the level corresponding to the volume is not obtained through querying the first corresponding relationship between volume and level according to the volume information, the method further includes:

if it is determined that the volume is lower than a minimum volume, setting the wake-up delay time as a sum of a wake-up delay time corresponding to a level corresponding to the minimum volume and a preset delay time; or, if it is determined that the volume is higher than a maximum volume, setting the wake-up delay time as a wake-up delay time corresponding to the level corresponding to the maximum volume;

where, the minimum volume is a minimum volume within a volume value range in the first corresponding relationship between volume and level or the second corresponding relationship between volume and level;

the maximum volume is a maximum volume within a volume value range in the first corresponding relationship between volume and level or the second corresponding relationship between volume and level.

The intelligent device wake-up method provided by the embodiment, through adjusting the wake-up delay time when the wake-up voice obtained is higher than the maximum volume or lower than the minimum volume, can ensure that the first corresponding relationship between volume and level or the second corresponding relationship between volume and level can be compatible with all volume information and, thus, no matter the user's voice is high or low, it can respond to the user's wake-up voice, thereby improving the user's experience.

In a possible design, further including:

when determining that wake-up delay time is the same as the wake-up delay time corresponding to at least one of other intelligent device in the group, judging whether a local priority level is higher than that of the at least one intelligent device respectively, and if the local priority level is highest, determining whether the response information sent by other intelligent device in the group is obtained within the wake-up delay time;

if the local priority level is lower than the at least one intelligent device, ending a delayed response operation.

The intelligent device wake-up method provided in this embodiment, through determining whether to respond to the wake-up voice according to the preset priority when determining that the wake-up delay time is the same as the wakeup delay time corresponding to at least one intelligent device in the other intelligent device in the group, can accurately ensure that only one intelligent device respond to the wake-up voice whenever the wake-up voice of the user is received, thereby improving the user's experience.

In a second aspect, an embodiment of the application provides an intelligent device, including:

a wake-up voice obtaining module, which is used for obtaining wake-up voice sent by users;

a wake-up delay time determining module, which is used for, when determining that a current wake-up mode is a group wake-up mode, recognizing volume information corresponding to obtained wake-up voice, and determining wake-up delay time according to the volume information;

a response module, which is used for, when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over.

In a possible design, further including:

a volume level generation request obtaining module, which is used for obtaining a volume level generation request sent by a terminal device, where the volume level generation request includes: a group identifier, quantity information of intelligent device with the group identifier, and an identifier of other intelligent device with the group identifier;

a volume information obtaining module, which is used for obtaining volume information corresponding to the identifier of the other intelligent device respectively, according to the volume level generation request; and a first corresponding relationship generating module, which is used for generating a first corresponding relationship between volume and level according to the volume information corresponding to the identifier of the other intelligent device, and the quantity information of the intelligent device with the group identifier.

In a possible design, further including:

a voiceprint recognizing module, which is used for recognizing voiceprint information corresponding to obtained wake-up voice;

where the volume information obtaining module includes:

a volume obtaining unit, which is used for obtaining volume information corresponding to the voiceprint information in the intelligent device corresponding to the identifier of the other intelligent device respectively, according to the volume level generation request;

and where the device further includes:

a second corresponding relationship generating module, which is used for generating a second corresponding relationship between volume and level according to the volume information corresponding to the voiceprint information of the intelligent device corresponding to the identifier of the other intelligent device, and the quantity information of the intelligent device with the group identifier.

In a possible design, further including:

an updating module, which is used for sending the first corresponding relationship between volume and level and the second corresponding relationship between volume and level to the intelligent device corresponding to the identifier of the other intelligent device, so that the other intelligent device performs an update process according to the first corresponding relationship between volume and level or the second corresponding relationship between volume and level.

In a possible design, the wake-up delay time determining module includes:

a first level obtaining unit, which is used for querying the first corresponding relationship between volume and level according to the volume information, and obtaining the level corresponding to the volume information; and a wake-up delay time determining unit, which is used for determining the wake-up delay time according to the level.

In a possible design, further including:

a corresponding relationship obtaining unit, which is used for obtaining a second corresponding relationship between volume and level corresponding to the voiceprint information, according to the voiceprint information;

a second level obtaining unit, which is used for querying the second corresponding relationship between volume and level according to the volume information, and obtaining the level corresponding to the volume information; and a wake-up delay time determining unit, which is used for determining the wake-up delay time according to the level.

In a possible design, the wake-up delay time determining unit is specifically used for:

obtaining the wake-up delay time T according to the level through following formula:

$$T=\text{level}*(K+D)$$

where, K represents internal voice processing delay of a device, and D represents voice transmission time.

In a possible design, where, if the level corresponding to the volume is not obtained through querying the first corresponding relationship between volume and level according to the volume information, further including:

a first adjusting module, is used for setting the wake-up delay time as a sum of a wake-up delay time corresponding to a level corresponding to the minimum volume and a preset delay time if it is determined that the volume is lower than a minimum volume;

or, a second adjusting module, is used for setting the wake-up delay time as a wake-up delay time corresponding to a level corresponding to the maximum volume if it is determined that the volume is higher than a maximum volume;

where, the minimum volume is a minimum volume within a volume value range in the first corresponding relationship between volume and level or the second corresponding relationship between volume and level;

the maximum volume is a maximum volume within a volume value range in the first corresponding relationship between volume and level or the second corresponding relationship between volume and level.

In a possible design, further including:

a priority determining module, is used for, when determining that the wake-up delay time is the same as wake-up delay time corresponding to at least one of other intelligent device in the group, judging whether a local priority level is higher than that of the at least one intelligent device respectively, and if the local priority level is highest, determining whether the response information sent by other intelligent device in the group is obtained within the wake-up delay time; and a processing module, is used for, if the local priority level is lower than the at least one intelligent device, ending a delayed response operation.

In a third aspect, an embodiment of the application provides an intelligent device, including:

at least one processor; and a memory in communication with the at least one processor, where, the memory is used for storing instructions that can be executed by the at least one processor, where the at least one processor is used for executing the intelligent device wake-up method according to the first aspect.

In a fourth aspect, an embodiment of the application provides a non-transient computer-readable storage medium storing computer instructions, the computer instructions are used to enabling a computer to execute the intelligent device wake-up method according to the first aspect.

The intelligent device wake-up methods, the intelligent devices and the computer-readable storage mediums provided by embodiments of the present application, through determining the corresponding wake-up delay time according to the volume information, and determining whether to respond to the wake-up voice according to the wake-up delay time, can ensure that only one intelligent device responds to the wake-up voice sent out by the user at any time, thereby avoiding the situation that multiple intelligent devices respond at the same time, and improving the user's experience. In addition, according to the intelligent device wake-up method provided embodiments, the intelligent device closer to the user responds faster to wake-up voice of the user, and the intelligent device farther away from the user responds to wake-up voice of the user slower, which is more in line with human conversation habits, and thus improves user's experience.

The other effects of the above optional methods will be described below in combination with specific embodiments.

BRIEF DESCRIPTION OF DRAWINGS

The attached drawings are used for facilitating the understanding of the solutions of the present application, but do not constitute a limitation of the application. Where.

DESCRIPTION OF EMBODIMENTS

The exemplary embodiments of the present application will be described below in combination with the attached drawings, which includes various details of the embodiments of the present application to facilitate understanding, which should be considered as exemplary merely. Therefore, those of ordinary skill in the art should realize that various changes and modifications may be made to the embodiments described herein without departing from the scope and spirit of the present application. Similarly, for clarity and simplicity, the following description omits the description of the public well-known function and structure.

In order to solve the problem of the existing intelligent device wakeup methods that multiple intelligent devices in a preset area may simultaneously respond to a wake-up instruction sent out by a user, the application provides an intelligent device wake-up method, an intelligent device and a computer-readable storage medium.

It should be noted that the intelligent device wake-up method, the intelligent device and the computer-readable storage medium provided in the application can be applied in any scenario for waking-up an intelligent device.

Figure 1:
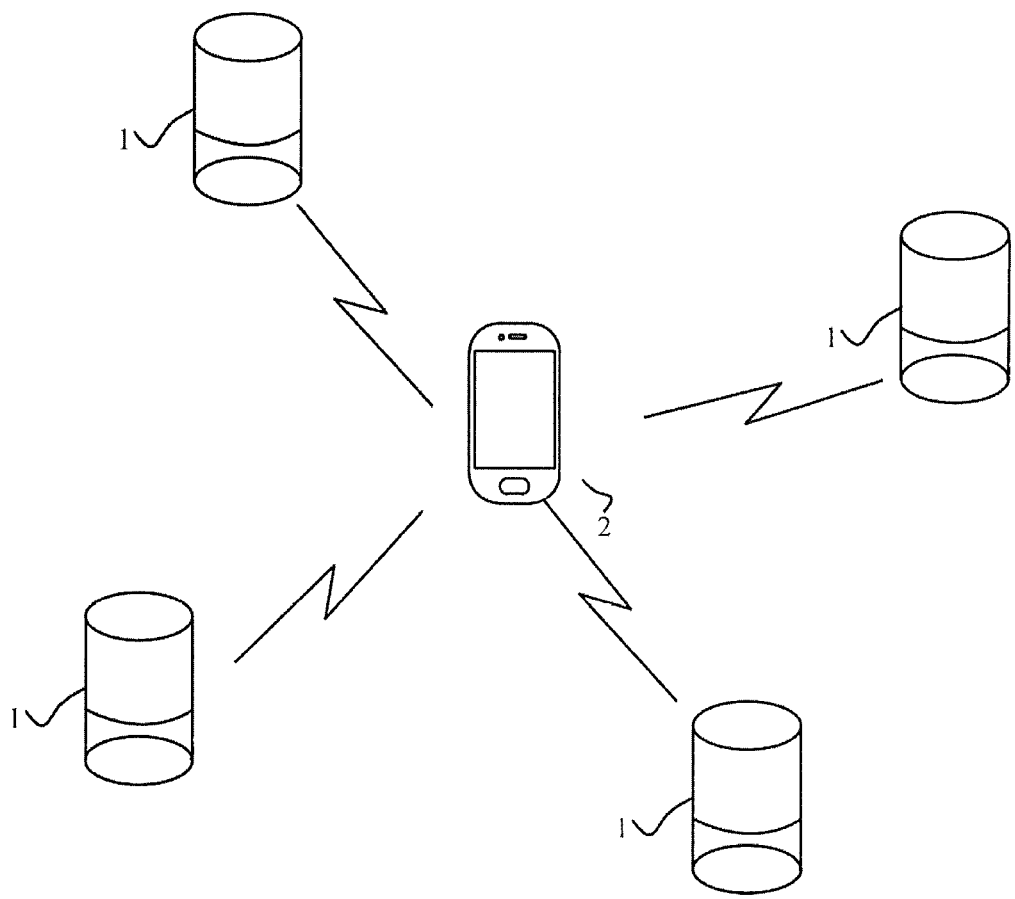
FIG. 1 is a diagram of a system structure on which an embodiment of the present application is based.

FIG. 1 is a diagram of a system structure on which an embodiment of the present application is based. As shown in FIG. 1, the diagram of a system structure on which the present application is base includes at least a plurality of intelligent devices 1 and a terminal device 2, where, the plurality of intelligent device 1 are respectively communicated with the terminal device 2. Where, the intelligent device 1 includes but is not limited to an intelligent speaker, an intelligent sweeping robot, an intelligent learning robot and etc.; the terminal device 2 can be a desktop computer, a tablet computer and etc.

Figure 2:
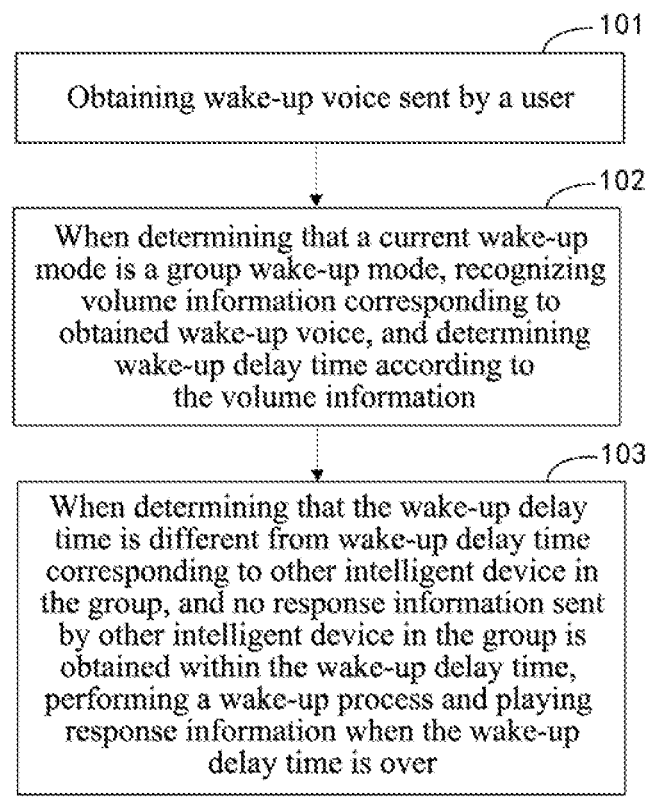
FIG. 2 is a schematic flowchart of an intelligent device wake-up method provided in Embodiment I of the present application.

FIG. 2 is a schematic flowchart of an intelligent device wake-up method provided in Embodiment I of the application, as shown in FIG. 2. The method includes:

Step 101, obtaining wake-up voice sent by a user.

The execution entity of the embodiment is an intelligent device. In practical applications, a user can set standard wake-up voice for intelligent devices according to their own needs, so as to realize voice wake-up for intelligent devices. For example, the user may set the standard wake-up voice as "Hello, intelligent device". When the user needs to wake up the intelligent device, the user just need to say "Hello, intelligent device", and then the intelligent device responds to the wake-up voice after receiving it. For example, the intelligent device may send the response message "Yes, I'm here", and perform the wake-up process, so as to further receive the further instructions to the intelligent device from the user. In order to realize the response to the wake-up voice, the intelligent device may monitor the voice sent by the user in real time, and compare the monitored voice with the preset wake-up voice. If the voice is consistent with the preset wake-up voice, the obtained voice is determined as the wake-up voice.

Step 102, when determining that a current wake-up mode is a group wake-up mode, recognizing volume information corresponding to obtained wake-up voice, and determining wake-up delay time according to the volume information.

In this embodiment, when multiple intelligent devices with the same wake-up voice are set in the same area at the same time, in order to avoid the situation that multiple intelligent devices may respond to the same wake-up voice at the same time, the intelligent device may be added with a group wake-up mode in addition to the original "one-call response" wake-up mode (that is, the default wake-up mode), so that the intelligent device can adjust the local wake-up mode according to its environment (whether there is only one device in the same area or not).

Figure 3:
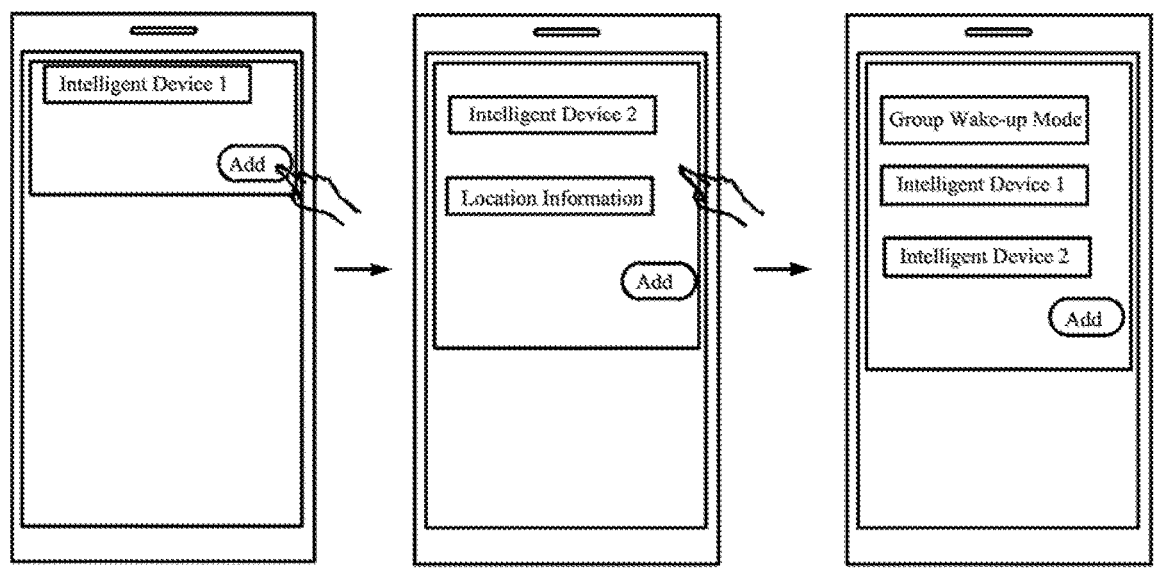
FIG. 3 is an interactive interface diagram of a group wake-up mode provided by an embodiment of the present application.

For example, FIG. 3 is a schematic diagram of setting a group wake-up mode provided by an embodiment of the application. As shown in FIG. 3, one way for the intelligent device to adjust the local wake-up mode is that: taking the home where the user lives as an example, when the intelligent device is located in the home and has been connected with the user's terminal device, the terminal device may add the intelligent device to its corresponding APP and obtain the location information of the intelligent device; when determining that the amount of intelligent devices having the address information is two, the terminal device set up a group corresponding to the address information, where the identifiers of the two intelligent devices are included in the group; or, when determining that a group corresponding to the address exists, the terminal device adds the identifier of the intelligent device to the group; and then, the terminal device sends the group identifier to intelligent terminals corresponding to the identifiers of the intelligent terminals within the group through a group notification message carrying the group identifier, so that the intelligent terminals switch the current wake-up mode from the default wake-up mode to the group wake-up mode according to the group notification message.

Based on this, after obtaining the wake-up voice, the intelligent device firstly determines the current wake-up mode, and directly perform the wake-up process and play the response message if it is determined that the current wake-up mode is the default wake-up mode. Or, if it is determined that the current wake-up mode is the group wake-up mode, it is learned that the device is in a scenario where there are multiple intelligent devices in the same area, and then whether to perform the wake-up and response process depends on the distance to the location of the sound source of the wake-up voice, and where the change of distance can be reflected by the volume of the wake-up voice received by the intelligent device. Therefore, the intelligent device can determine the wake-up delay time corresponding to the volume information corresponding to the obtained wake-up voice after recognizing the volume information of the obtained wake-up voice.

It should be noted that any volume calculation method can be used to calculate the volume information corresponding to the wake-up voice, which is not limited in the present application. In addition, the manner of determining the wake-up delay time corresponding to the wake-up voice according to the volume information may include but is not limited to the following:

presetting the corresponding relationship between volume information and wake-up delay time, and determining wake-up delay time corresponding to wake-up voice according to the corresponding relationship after obtaining the volume information corresponding to the wake-up voice; or, presetting the corresponding relationship between volume and level, determining the level corresponding to the volume information, and determining wake-up delay time corresponding to the wake-up voice according to the level.

It should be noted that the lower the volume information is, the longer the corresponding wake-up delay time is and, accordingly, the higher the volume information is, the shorter the corresponding wake-up delay time is. That is, the intelligent device that is closer to the sound source of the wake-up voice responds to the user's wake-up voice faster, and the intelligent device that is farther away from the user responds to the user's wake-up voice more slowly, which is more in line with human conversation habits, and thereby improving the user's experience.

Step 103, when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over.

In this embodiment, after determining the wake-up delay time corresponding to the wake-up voice, in order to avoid the situation that at least two intelligent devices may have the same distance to the sound source of the wake-up voice, which will cause simultaneous response and wake-up, it is necessary to determine firstly whether the determined wake-up delay time is the same as the wake-up delay time of any other intelligent device in the group.

For example, the implementation manner for determining whether the wake-up delay time of the intelligent device in a group is the same includes but is not limited to the following:

one manner is that the intelligent device may send the wake-up delay time and the identifier of the intelligent device to other intelligent devices in the same group. In the same way, the intelligent device may also receive the wake-up delay time and the identifier of the intelligent device sent by each other intelligent device in the same group. Then, the intelligent device can determine whether the wake-up delay time determined by the intelligent device is the same as the wake-up delay time of any other intelligent device in the group.

Another manner is that the intelligent device may send the wake-up delay time, the identifier of the intelligent device, and the identifier of its corresponding group to the terminal device. The terminal device performs a judgment after receiving the wake-up delay time sent by each of the intelligent devices in the group corresponding to the identifier of the group. If the wake-up delay time is the same, and the same wake-up delay time is the minimum wake-up delay time among all the received wake-up delay time, the terminal device may further judges the priorities of identifiers of the intelligent terminal devices corresponding to the same wake-up delay time, and send a notification message indicating that the wake-up delay time is the same to the intelligent terminal device with a lower priority, then the intelligent terminal device, receiving the notification message indicating that the wake-up delay time is the same, determines that its wake-up delay time is the same as that of other intelligent devices in the group.

On the contrary, if the terminal device determines that none of the wake-up delay time is the same, or there is a wake-up delay time that is the same but the wake-up delay time is not the minimum wake-up delay time among the received wake-up delay time, then the terminal device does not send the notification message indicating that the wake-up delay time is the same. The intelligent device does not receive the notification message indicating that the wake-up delay time is the same when the wake-up delay time is over, and determines that its wake-up delay time is different from the wake-up delay time of any other intelligent device in the group. Or, the terminal device sends notification messages indicating that no wake-up delay time is the same to each intelligent device, and the intelligent terminal device, receiving the notification message indicating that no wake-up delay time is the same, can determine that its wake-up delay time is different from the wake-up delay time of any other intelligent device in the group.

When it is determined that the wake-up delay time is not the same as the wake-up delay time of any other intelligent device in the group, the intelligent device will monitor, within its wake-up delay time, whether the response information sent by any other intelligent device is received. If no response message sent by any other intelligent device is received within the wake-up delay time, which indicates that the intelligent device has the shortest distance to the sound source of the wake-up voice, then the intelligent device performs the wake-up process, and generate and play response information.

Similarly, any other intelligent device, after receiving the response information sent by the intelligent device through monitoring within its corresponding wake-up delay time, stops waiting for the wake-up operation, and switch to continue monitoring the wake-up voice.

Figure 4:
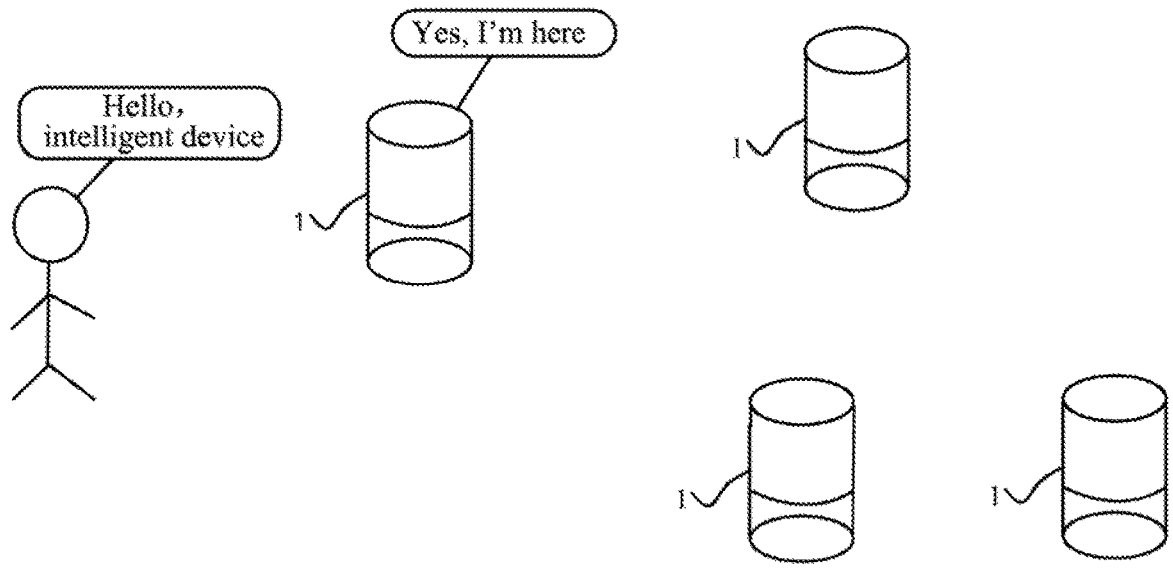
FIG. 4 is a schematic diagram of a scenario for waking-up an intelligent device provided in an embodiment of the application.

To sum up, for example, FIG. 4 is the schematic diagram of a scenario for waking up an intelligent device provided by an embodiment of the application. As shown in FIG. 4, there are multiple intelligent devices in the same area, and these intelligent devices are connected with a terminal device, so as to establish a group of the intelligent devices through the terminal device, which enables each intelligent device in the group switches to the group wake-up mode. When a user sends out a wake-up voice "Hello, intelligent device", the wake-up voice is obtained by multiple intelligent devices in the group through monitoring. The intelligent device, under the group wake-up mode, the volume information of the wake-up voice, and determines the wake-up delay time based on the volume information. It could be known on the basis of FIG. 4, for the intelligent device which is closest to the user's wake-up voice "Hello, intelligent device", compared with the wake-up delay time of other intelligent devices in the group, the determined wake-up delay time is the shortest. Then, when the wake-up delay time ends, the intelligent device sends the response message "Yes, I'm here" with priority, and performs the wake-up process. At the same time, the other intelligent devices will receive the response message "Yes, I'm here" through monitoring within the corresponding wake-up delay time, and then stop waiting for the wake-up operation and continue to listen to the wake-up voice.

The intelligent device wake-up method provided in this embodiment, after obtaining the wake-up voice sent by the user and determining that the current wake-up mode is group wake-up mode, determines the corresponding wake-up delay time according to the volume information corresponding to the wake-up voice, and responses to the wake-up voice accordingly in the case that the wake-up delay time is different from that of other intelligent devices in the group and no response information is received from the other intelligent devices within the wake-up delay time, and thus can ensure that, even in the situation that there are multiple intelligent devices in the same area and the wake-up voice thereof is the same voice, only one intelligent device responds to the wake-up voice whenever the user sends the wake-up voice, thereby avoiding the problem of mutual interference caused by multiple intelligent devices responding at the same time, and improving the flexibility and effectiveness for waking an intelligent device when there are multiple intelligent devices in the same area. In addition, on the one hand, determining the wake-up delay time is to avoid the simultaneous response of multiple intelligent devices, and on the other hand, the intelligent device closer to the user responds faster to the user's wake-up voice, while the intelligent device farther away from the user responds to the user's wake-up voice slower, which is more in line with human conversation habits, and thus further improves the user's experience while avoiding the situation that multiple intelligent devices respond at the same time.

Figure 5:
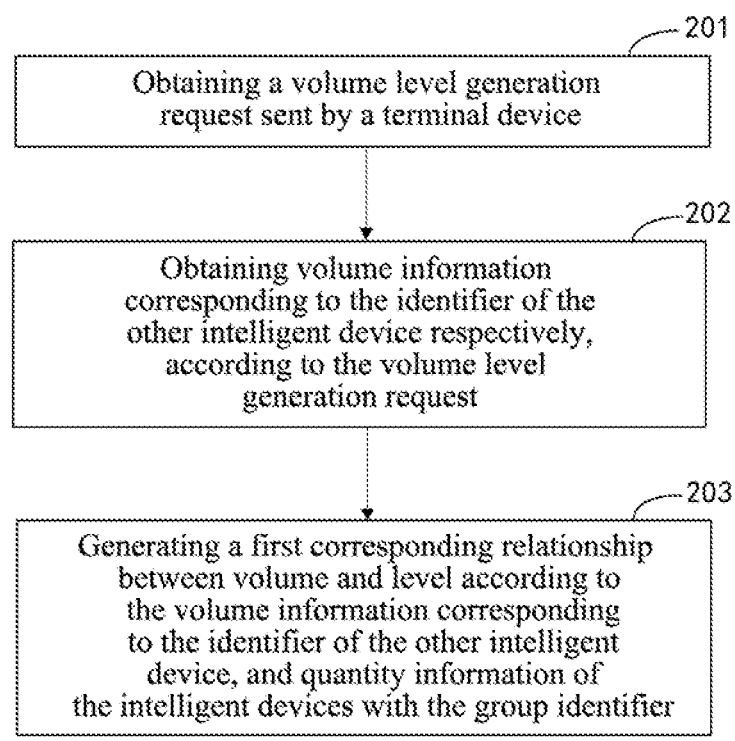
FIG. 5 is a schematic flowchart of an intelligent device wake-up method provided in Embodiment II of the present application.

FIG. 5 is a schematic flowchart of an intelligent device wake-up method provided in Embodiment 2 of the present application. On the basis of any of the above embodiments, as shown in FIG. 5, the method further includes:

Step 201, obtaining a volume level generation request sent by a terminal device; where the volume level generation request includes: quantity information of intelligent device with the group identifier, and an identifier of other intelligent device with the group identifier;

Step 202, obtaining volume information corresponding to the identifier of the other intelligent device respectively, according to the volume level generation request;

Step 203, generating a first corresponding relationship between volume and level according to the volume information corresponding to the identifier of the other intelligent device, and the quantity information of the intelligent device with the group identifier.

The wake-up delay time can be determined based on the corresponding relationship between volume information and wake-up delay time as described in Embodiment I, or based on the corresponding relationship between volume and level. In this embodiment, a specific implementation manner for determining the wake-up delay time according to the corresponding relationship between volume and level is as follows: as shown in FIG. 1, the intelligent device can communicate with the terminal device, so it can communicate information with the terminal device. In order to realize that only one intelligent device responds to the wake-up voice at each time the user sends out the wake-up voice, in the condition that its intelligent devices join the group and switch the wake-up mode to group wake-up mode, the terminal device may further set the corresponding relationship between volume and level to determine the wake-up delay time.

Specifically, the intelligent device may receive the volume level generation request sent by the terminal device. Since a terminal device can control the intelligent devices in multiple areas separately, the terminal device can set multiple groups based on different areas. In order to achieve a precise control of a specified intelligent device, the volume level generation request includes: a group identifier, quantity information of intelligent devices with the group identifier, and the identifiers of other intelligent devices with the group identifier.

Further, an intelligent device newly added to the group, may obtain the volume information corresponding to the identifiers of other intelligent devices respectively according to the volume level generation request, where, the volume information may be the volume information of wake-up voice received by other intelligent devices in history. After obtaining the volume information corresponding to the identifiers of other intelligent devices, the intelligent device can generate the first corresponding relationship between volume and level according to the volume information corresponding to the identifiers of other intelligent devices and the quantity information of intelligent devices with the group identifier.

The intelligent devices already in the group, may receive the first corresponding relationship between volume and level to update the locally stored original relationship between volume and level.

In addition, the implementation manner for the intelligent device to obtain the volume information corresponding to the identifiers of other intelligent devices in the group may include but is not limited to the following: the intelligent device can directly communicate information with other intelligent devices to obtain the volume information corresponding to the identifiers of other intelligent devices; in addition, other intelligent devices can also send their corresponding volume information to the terminal device and, accordingly, the intelligent device can obtain the volume information corresponding to the identifiers of other intelligent devices from the terminal device; in addition, other intelligent devices can also send their corresponding volume information to the server and, accordingly, the intelligent device can obtain the volume information corresponding to the identifiers of other intelligent devices from the server.

Figure 6:
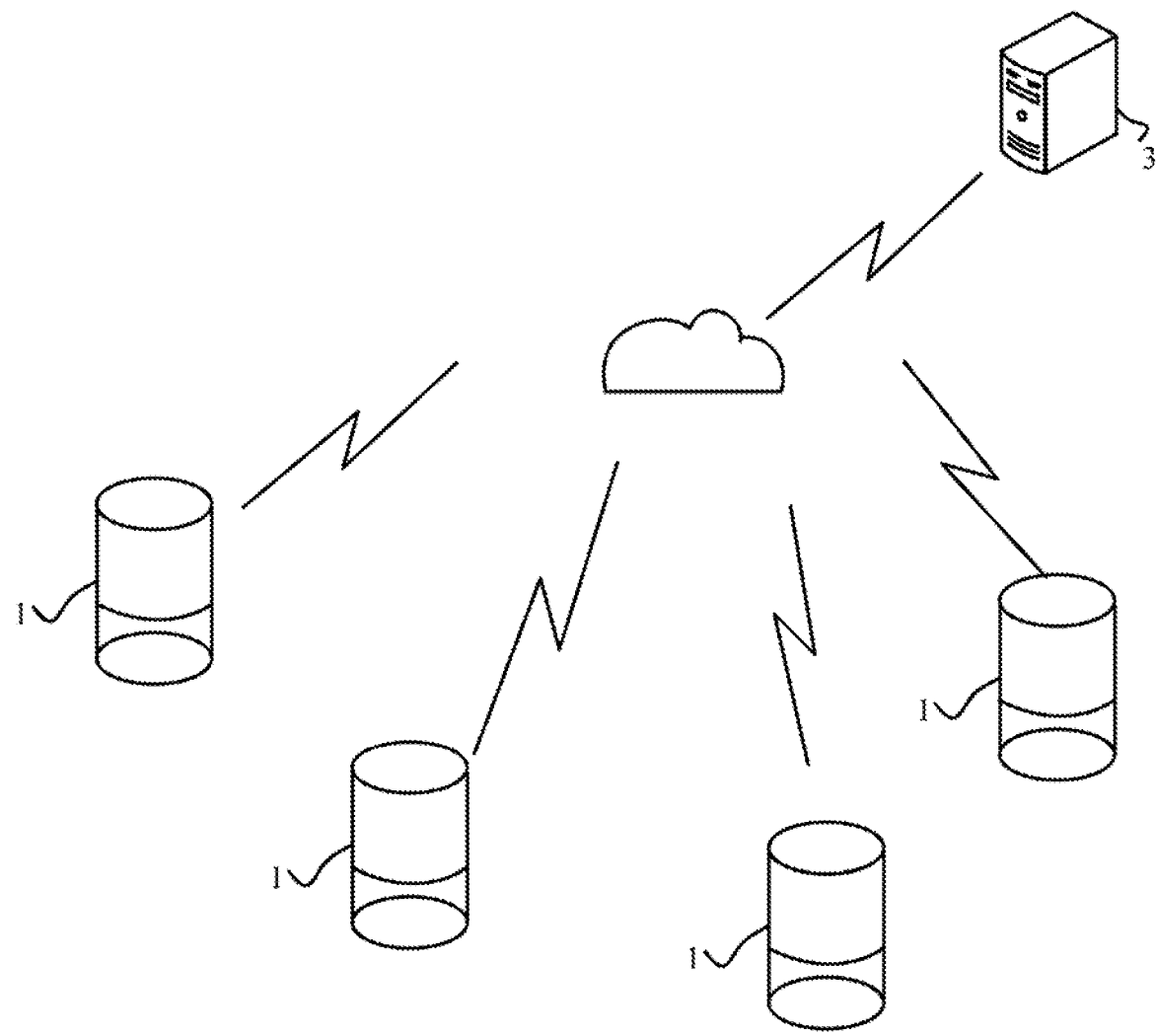
FIG. 6 is a diagram of another system structure on which an embodiment of the present application is based.

For example, FIG. 6 is a diagram of another system structure on which an embodiment of the application is based. As shown in FIG. 6, the intelligent device 1 can further communicate with the data server 3 (such as the service platform corresponding to the intelligent device), and send the volume information corresponding to the obtained wake-up voice to the data server 3 for storage. Accordingly, when setting the corresponding relationship between volume and level, the intelligent device 1 can directly obtain the volume information corresponding to the identifiers of other intelligent devices from the data server 3. Where, data server 3 may be a cloud server or a server cluster, storing a large amount of data.

Furthermore, after obtaining the volume information corresponding to the identifiers of other intelligent devices, the intelligent device can sort the volume information corresponding to the identifiers of other intelligent devices according to a preset sorting rule. Where, the sorting rule may be sorting in the order of the volume information from high to low, or may be sorting in the order of the volume information from low to high. The sorted volume information is evenly divided into sub-categories corresponding to the quantity information of the intelligent devices with the group identifier.

For example, if there are four intelligent devices in the current group, and the newly added intelligent device obtains 20 pieces of volume information from other intelligent devices, then the volume information can be sorted into four sub-categories, each of which includes 5 pieces of volume information. For each sub-category, calculate a volume average corresponding to the volume information in the sub-category, and obtain a volume average corresponding to the quantity information of the intelligent devices with the group identifier. Corresponding level information is set for each volume average value according to a preset level setting rule to obtain the corresponding relationship between volume and level. Specifically, the preset volume setting rule may set a maximum volume average value as the first level; in an implementation, a minimum volume average value may also be set as the first level.

It should be noted that the level can correspond to its average volume, and can also correspond to a range of volume with a preset amplitude above and below the average volume.

Further, after obtaining the first relationship between volume and level, the wake-up delay time can be determined according to the first relationship between volume and level. On the basis of any of the above embodiments, Step 102 specifically includes:

querying the first corresponding relationship between volume and level according to the volume information, and obtaining the level corresponding to the volume information; and determining the wake-up delay time according to the level.

In this embodiment, after obtaining the wake-up voice of the user and determining the volume information corresponding to the wake-up voice, the first corresponding relationship between volume and level can be queried according to the volume information, and then the level corresponding to the volume information can be determined. Taking each level corresponding to a volume range for example, the first level may be 80-100 db, the second level may be 60-79 db, the third level may be 40-59 db, the fourth level may be 20-39 db, and the fifth level may be 0-19 db.

If it is determined that the volume information corresponding to the user's wake-up voice is 56 db, then the level corresponding to the volume information can be quickly determined as the third level according to the first corresponding relationship between volume and level.

In addition, after determining the level corresponding to the volume information, the wake-up delay time corresponding to the level can be determined according to the corresponding relationship between level and wake-up delay time. Or, obtain the wake-up delay time T according to the level through following formula:

$$T = level * (K+D)$$

where, K represents internal voice processing delay of device, and D represents voice transmission time.

For example, the internal voice processing delay of device K may be 185 ms, the voice transmission time D may be 15 ms, when the level corresponding to the volume information is level 2, the wake-up delay time $T=2*(185+15)=400$ ms; when the level corresponding to the volume information is level 3, the wake-up delay time $T=3*(185+15)=600$ ms.

Where, different intelligent devices and different application scenarios may have different voice processing delay K and different voice transmission time D. The present application does not limit it here.

In this embodiment, the corresponding relationship between volume and level can be further determined according to the volume information corresponding to wake-up voice and the quantity of intelligent devices historically collected by other intelligent devices in the group, and the wake-up delay time can be determined based on thereon. Since the method takes into consideration the factor that the volumes of receiving the wake-up voice within a certain area by the other intelligent devices in the group are different because of the different distances between the other intelligent devices and the sound source of the wake-up voice, and the quantity of the intelligent devices in the group, the determination of wake-up delay time is in accordance with the change range of user volume in the area corresponding to the group, and thus the determination of wake-up delay time is more accurate.

Figure 7:
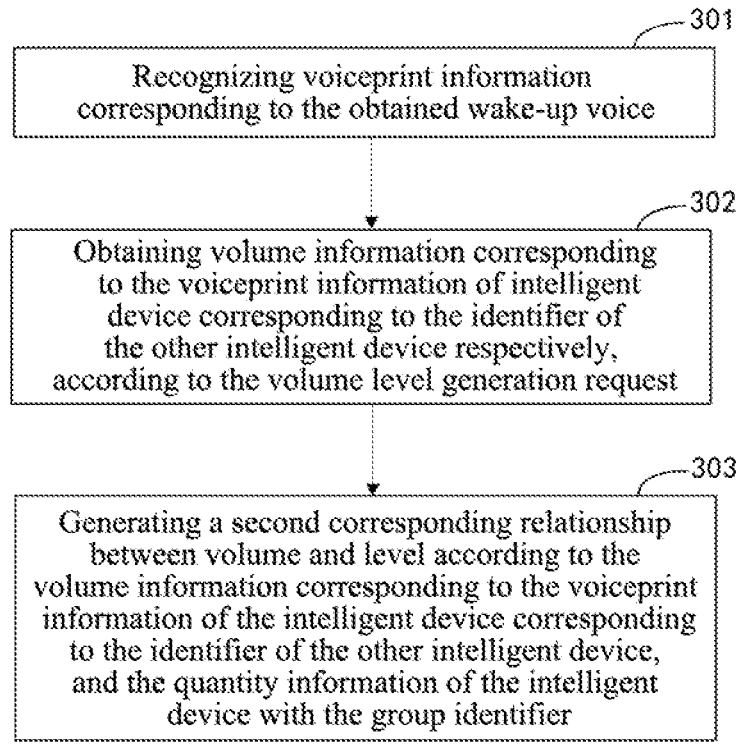
FIG. 7 is a flow chart of an intelligent device wake-up method provided in Embodiment III of the present application.

FIG. 7 is a flow chart of an intelligent device wake-up method provided in Embodiment III of the present application. Based on any of the above embodiments, as shown in FIG. 7, the method further includes:

Step 301, recognizing voiceprint information corresponding to the obtained wake-up voice;

then the method further includes:

Step 302, obtaining volume information corresponding to the voiceprint information of intelligent device corresponding to the identifier of the other intelligent device respectively, according to the volume level generation request;

then the method further includes:

Step 303, generating a second corresponding relationship between volume and level according to the volume information corresponding to the voiceprint information of the intelligent device corresponding to the identifier of the other intelligent device, and the quantity information of the intelligent device with the group identifier.

In this embodiment, each intelligent device may be used by multiple users at the same time, and different users may have different volume change ranges. For example, the volume ranges of women's and children's voice are generally different from that of men's voice, and the high-pitch part of the volume range is more than that of the men's voice. Based on this, in order to determine the wake-up delay time with further accuracy, different users need to be further considered in establishing the corresponding relationship between volume and level for determining the wake-up delay time. Specifically, user categories may be performed through voiceprint information, and different corresponding relationships between volume and level are set for each category.

More specifically, the voiceprint information corresponding to the obtained wake-up voice can be recognized, and then volume information corresponding to the voiceprint information of intelligent device corresponding to the identifier of the other intelligent device can be obtained respectively according to the volume level generation request. Then the second corresponding relationship between volume and level can be generated according to the volume information corresponding to the voiceprint information of the intelligent device corresponding to the identifier of the other intelligent device, and the quantity information of the intelligent device with the group identifier.

For example, the intelligent device can sort the volume information corresponding to the identifiers of other intelligent devices according to a preset sorting rule. Where, the sorting rule may be sorting in the order of the volume information from high to low, or may be sorting in the order of the volume information from low to high. The sorted volume information is evenly divided into sub-categories corresponding to the quantity information of the intelligent devices with the group identifier. For example, if there are four intelligent devices in the current group, and the newly added intelligent device obtains 20 pieces of volume information from other intelligent devices, then the volume information can be sorted into four sub-categories, each of which includes 5 pieces of volume information. For each sub-category, calculate a volume average corresponding to the volume information in the sub-category, and obtain a volume average corresponding to the quantity information of the intelligent devices with the group identifier. Corresponding level information is set for each volume average value according to a preset level setting rule to obtain the corresponding relationship between volume and level. Specifically, the preset volume setting rule may set a maximum volume average value as the first level; in an implementation, a minimum volume average value may also be set as the first level.

Further, after generating the second corresponding relationship between volume and level corresponding to the voiceprint information, the wake-up delay time can be determined according to the second corresponding relationship between volume and level. On the basis of any of the above embodiments, Step 102 specifically includes:

obtaining the second corresponding relationship between volume and level corresponding to the voiceprint information, according to the voiceprint information;

querying the second corresponding relationship between volume and level according to the volume information, and obtaining the level corresponding to the volume information; and determining the wake-up delay time according to the level.

In this embodiment, after obtaining the wake-up voice of the user, it is necessary to firstly determine the voiceprint information corresponding to the wake-up voice, obtain the second corresponding relationship between volume and level corresponding to the voiceprint information, determine the volume information corresponding to the wake-up voice, query the second corresponding relationship between volume and level according to the volume information, and determine the level corresponding to the volume information. It should be noted that each level may correspond to a range of volume, or may correspond to a fixed volume information. After determining the level corresponding to the volume information, the wake-up delay time can be determined according to the level.

In addition, after determining the level corresponding to the volume information, the wake-up delay time corresponding to the level can be determined according to the corresponding relationship between level and wake-up delay time. Or, obtain the wake-up delay time T according to the level through following formula:

$$T = \text{level} * (K+D)$$

where, K represents internal voice processing delay of device, and D represents voice transmission time.

For example, the internal voice processing delay of device K may be 185 ms, the voice transmission time D may be 15 ms, when the level corresponding to the volume information is level 2, the wake-up delay time $T=2*(185+15)=400$ ms; when the level corresponding to the volume information is level 3, the wake-up delay time $T=3*(185+15)=600$ ms.

Where, different intelligent devices and different application scenarios may have different voice processing delay K and different voice transmission time D. The present application does not limit it here.

In this embodiment, the corresponding relationship between volume and level can be determined not only according to voiceprint, but also according to the volume information corresponding to wake-up voice and the quantity of intelligent devices historically collected by other intelligent devices in the group, and the wake-up delay time can be determined based on thereon. Since the method not only takes the difference among users' volume range changes into consideration, but also takes into consideration the factor that the volumes of receiving the wake-up voice within a certain area by the other intelligent devices in the group are different because of the different distances between the other intelligent devices and the sound source of the wake-up voice, and takes the quantity of the intelligent devices in the group into consideration, the determination of wake-up delay time is in accordance with the change range of user volume in the area corresponding to the group, and thus the determination of wake-up delay time is more accurate.

Further, on the basis of any of the above embodiments, the method further includes:

sending the first corresponding relationship between volume and level and the second corresponding relationship between volume and level to the intelligent devices corresponding to the identifiers of the other intelligent devices, so that the other intelligent devices perform an update process according to the first corresponding relationship between volume and level or the second corresponding relationship between volume and level.

In this embodiment, after generating the first corresponding relationship between volume and level or the second corresponding relationship between volume and level, in order to enable each intelligent device in the group to determine the wake-up delay time according to the first corresponding relationship between volume and level or the second corresponding relationship between volume and level, the first corresponding relationship between volume and level or the second corresponding relationship between volume and level may be sent to the intelligent devices corresponding to the identifiers of the other intelligent devices. Accordingly, after receiving the first corresponding relationship between volume and level or the second corresponding relationship between volume and level, the intelligent devices corresponding to the identifiers of other intelligent devices can update the currently stored corresponding relationship between volume and level according to the received first corresponding relationship between volume and level or the received second corresponding relationship between volume and level. It should be noted that the intelligent device can directly communicate information with other intelligent devices in the group, send the first corresponding relationship between volume and level or the second corresponding relationship between volume and level to other intelligent devices, or send the first corresponding relationship between volume and level or the second corresponding relationship between volume and level to the terminal device, so that other intelligent devices can obtain the first corresponding relationship between volume and level or the second corresponding relationship between volume and level from the terminal device.

The intelligent device wake-up method provided by the embodiment, through sending the first corresponding relationship between volume and level or the second corresponding relationship between volume and level to the intelligent device corresponding to the identifier of other intelligent device after generating the first corresponding relationship between volume and level or the second corresponding relationship between volume and level, so that other intelligent device in the group can determine wake-up delay time according to the first corresponding relationship between volume and level or the second corresponding relationship between volume and level, and thus can realize that, when wake-up voice sent by the user is obtained, only one intelligent device responds to the wake-up voice, thereby improving the user's experience.

It should be noted that the first corresponding relationship between volume and level or the second corresponding relationship between volume and level can be generated by the intelligent device itself, or can be generated by the terminal device after obtaining the volume information corresponding to each intelligent device, and then sent to each intelligent device. This application does not limit this.

Further, on the basis of any of the above embodiments, if the level corresponding to the volume is not obtained through querying the first corresponding relationship between volume and level according to the volume information, the method further includes:

if it is determined that the volume is lower than a minimum volume, setting the wake-up delay time as a sum of a wake-up delay time corresponding to a level corresponding to the minimum volume and a preset delay time;

or, if it is determined that the volume is higher than a maximum volume, setting the wake-up delay time as a wake-up delay time corresponding to a level corresponding to the maximum volume;

where, the minimum volume is a minimum volume within a volume value range in the first corresponding relationship between volume and level or the second corresponding relationship between volume and level;

the maximum volume is a maximum volume within a volume value range in the first corresponding relationship between volume and level or the second corresponding relationship between volume and level.

In this embodiment, the following scenario may exist, which makes the volume information corresponding to the wake-up voice sent by the user exceeds the maximum volume in the corresponding relationship, or is lower than the minimum volume in the corresponding relationship. For example, when the user wake up in the morning, the volume of the wake-up voice may be relative high, and accordingly, before falling asleep at night, the volume of the wake-up voice may be relative low; or, if there are multiple people chatting currently, the volume of the wake-up voice may be relative high, while there are only two people chatting, the volume of the wake-up voice may be relative low. Or, the user may have a problem in pronouncing due to a cold or the like.

Based on this, for the above scenarios, in order to enable the intelligent device to obtain the wake-up delay time, so as to meet the requirement that only one intelligent device responds to the wake-up voice in the situation that there are multiple intelligent devices exist in the same area, the intelligent device also needs to perform the following operations:

when determining that the volume is lower than a minimum volume, setting the wake-up delay time as a sum of a wake-up delay time corresponding to a level corresponding to the minimum volume and a preset delay time;

when determining that the volume is higher than a maximum volume, setting the wake-up delay time as a wake-up delay time corresponding to a level corresponding to the maximum volume.

The operation of determining whether to respond to the response based on the wake-up delay time is the same as that of the previous embodiments, which will not be described here.

In addition, in an implementation, in the mean time of setting the wake-up delay time as a wake-up delay time corresponding to a level corresponding to the maximum volume when determining that the volume is higher than a maximum volume, a priority tag may be further set. Thus, when there is the same wake-up delay time among the obtained wake-up delay time of other intelligent devices, and only the intelligent device itself has a priority tag, then the intelligent device may send a notification message indicating that the wake-up delay time is the same to the intelligent device corresponding to the same wake-up delay time, so that the intelligent device receiving the notification message indicating that the wake-up delay time is the same stops the wake-up operation and continues to monitor the wake-up voice. Or, the intelligent device may send the identifier, the wake-up delay time and the priority tag of the intelligent device to the terminal device, and the terminal device performs a judgment on the received wake-up delay time, and further judges, when it is judged that there is the same wake-up delay time, based on the priority tag that which intelligent device shall continue to maintain the wake-up delay time for wake-up process and which intelligent device shall stop the response process.

It should be noted that the preset wake-up delay time may be set for the user according to the actual needs, or a system default experience value, which is not limited in this application.

The intelligent device wake-up method provided by the embodiment, through adjusting the wake-up delay time when the wake-up voice obtained is higher than the maximum volume or lower than the minimum volume, can ensure that the first corresponding relationship between volume and level or the second corresponding relationship between volume and level can be compatible with all volume information and, thus, no matter the user's voice is high or low, it can respond to the user's wake-up voice, thereby improving the user's experience.

Further, on the basis of any of the above embodiments, the method further includes:

when determining that wake-up delay time is the same as the wake-up delay time corresponding to at least one of other intelligent device in the group, judging whether a local priority level is higher than that of the at least one intelligent device respectively, and if the local priority level is highest, determining whether the response information sent by other intelligent device in the group is obtained within the wake-up delay time;

if the local priority level is lower than the at least one intelligent device, ending a delayed response operation.

In this embodiment, when the distance between the user and at least one intelligent device is the same, it is possible that the volume information of wake-up voice received by at least one intelligent device is the same, accordingly, the corresponding wake-up delay time is the same; or, when the volume information corresponding to the current wake-up voice is higher than the maximum volume within the volume value range in the first corresponding relationship between volume and level or the second corresponding relationship between volume and, setting the wake-up delay time as the wake-up delay time corresponding to the level corresponding to the maximum volume may also cause the situation that the volume information of the wake-up voice received by at least one intelligent device is the same, accordingly, the corresponding wake-up delay time is also the same. At this time, in order to ensure that only one intelligent device responds to the received wake-up voice sent out by the user, the intelligent device may judge whether the local priority level is higher than the at least one intelligent devices respectively, and if the local priority level is highest, determine whether the response information sent by the other intelligent devices is received within the wake-up delay time and, if no, send the response information in responding to the wake-up instruction; accordingly, if the local priority level is lower than the at least one intelligent device, end a delayed response operation, where, an intelligent device with a high priority level may send the response information in responding to the wake-up instruction if no response information from other intelligent devices is received in its wake-up delay time.

As a manner of implementation, the setting of priority can be as the same as the setting of priority tag in the previous embodiment. In addition, the priority setting can also be that: the terminal device automatically divides the priorities of the intelligent devices in the group based on the number of times that the intelligent device in the group are used and different users' preference of using different intelligent devices. Moreover, the setting of priority can also be: dividing the priorities of the intelligent settings in the group based on the priority indication of the user.

Further, the terminal device can also send the priority level identifier corresponding to its intelligent device to the corresponding intelligent device in the group. Intelligent devices can save their own respective priorities. Then, after the intelligent device obtains the wake-up delay time, obtains the wake-up delay time and priorities of other intelligent devices, and determines that there is an intelligent device with the same wake-up delay time as itself, the intelligent device can further compare the priority of that intelligent device and the priority itself. The intelligent device with higher priority continues to perform delayed response process, and sends a notification message indicating that there is a same wake-up delay time to the intelligent device with the lower priority, so that the intelligent device receiving the notification message indicating that there is a same wake-up delay time stops the response process. Therefore, by using the priorities, it can be ensured, more accurately and being more consistent with the user's using habits, that only one intelligent device responds to the user's wake-up voice when the user's wake-up voice.

Figure 8:
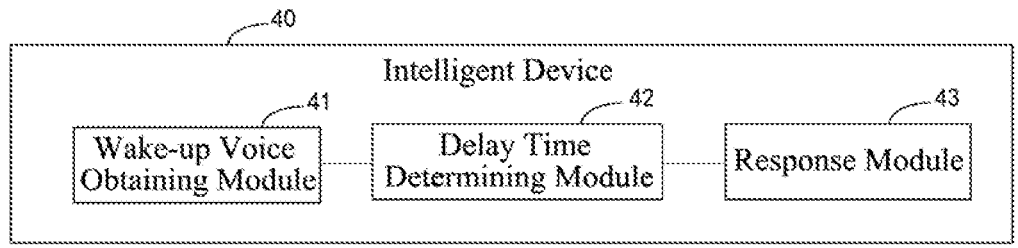
FIG. 8 is a structural diagram of an intelligent device provided in Embodiment IV of the present application.

FIG. 8 is a schematic structural diagram of an intelligent device provided in Embodiment IV of the present application. As shown in FIG. 8, the intelligent device 40 includes: a wake-up voice obtaining module 41, a wake-up delay time determining module 42 and a response module 43. Where, the wake-up voice obtaining module 41 is used for obtaining wake-up voice sent by a user; the wake-up delay time determining module 42 is used for, when determining that a current wake-up mode is a group wake-up mode, recognizing volume information corresponding to obtained wake-up voice, and determining wake-up delay time according to the volume information; and the response module 43 is used for, when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over.

The intelligent device in this embodiment can execute the method shown in Embodiment I, and its implementation manners and technical effects are similar, which are not described here again.

Further, on the basis of Embodiment IV, the device further includes:

a volume level generation request obtaining module, which is used for obtaining a volume level generation request sent by a terminal device, wherein the volume level generation request comprises: a group identifier, quantity information of intelligent device with the group identifier, and an identifier of other intelligent device with the group identifier;

a volume information obtaining module, which is used for obtaining volume information corresponding to the identifier of the other intelligent device respectively, according to the volume level generation request; and a first corresponding relationship generating module, which is used for generating a first corresponding relationship between volume and level according to the volume information corresponding to the identifier of the other intelligent device, and the quantity information of the intelligent device with the group identifier.

The intelligent device in the embodiment can execute the method shown in the above Embodiment II, and its implementation way is similar to the technical effect, which will not be described here.

Further, on the basis of the above Embodiment IV, the device further includes:

a voiceprint recognizing module, which is used for recognizing voiceprint information corresponding to obtained wake-up voice;

where the volume information obtaining module includes:

a volume obtaining unit, which is used for obtaining volume information corresponding to the voiceprint information in the intelligent device corresponding to the identifier of the other intelligent device respectively, according to the volume level generation request;

and where the device further includes:

a second corresponding relationship generating module, which is used for generating a second corresponding relationship between volume and level according to the volume information corresponding to the voiceprint information of the intelligent device corresponding to the identifier of the other intelligent device, and the quantity information of the intelligent device with the group identifier.

The intelligent device in the embodiment can execute the method shown in the above Embodiment III, and its implementation way is similar to the technical effect, which will not be described here.

Further, on the basis of any of the above embodiments, the device further includes:

an updating module, which is used for sending the first corresponding relationship between volume and level and the second corresponding relationship between volume and level to the intelligent device corresponding to the identifier of the other intelligent device, so that the other intelligent device performs an update process according to the first corresponding relationship between volume and level or the second corresponding relationship between volume and level.

Further, on the basis of any of the above embodiments, the wake-up delay time determining module 42 includes:

a first level obtaining unit, which is used for querying the first corresponding relationship between volume and level according to the volume information, and obtaining the level corresponding to the volume information; and a wake-up delay time determining unit, which is used for determining the wake-up delay time according to the level.

Further, on the basis of any of the above embodiments, the device further includes:

a corresponding relationship obtaining unit, which is used for obtaining a second corresponding relationship between volume and level corresponding to the voiceprint information, according to the voiceprint information;

a second level obtaining unit, which is used for querying the second corresponding relationship between volume and level according to the volume information, and obtaining the level corresponding to the volume information; and a wake-up delay time determining unit, which is used for determining the wake-up delay time according to the level.

Further, on the basis of any of the above embodiments, the wake-up delay time determining unit is specifically used for:

obtaining the wake-up delay time T according to the level through following formula:

$$T=\text{level}*(K+D)$$

where, K represents internal voice processing delay of a device, and D represents voice transmission time.

Further, on the basis of any of the above embodiments, if the level corresponding to the volume is not obtained through querying the first corresponding relationship between volume and level according to the volume information, the device further includes:

a first adjusting module, is used for setting the wake-up delay time as a sum of a wake-up delay time corresponding to a level corresponding to the minimum volume and a preset delay time if it is determined that the volume is lower than a minimum volume;

or, a second adjusting module, is used for setting the wake-up delay time as a wake-up delay time corresponding to a level corresponding to the maximum volume if it is determined that the volume is higher than a maximum volume;

where, the minimum volume is a minimum volume within a volume value range in the first corresponding relationship between volume and level or the second corresponding relationship between volume and level; and the maximum volume is a maximum volume within a volume value range in the first corresponding relationship between volume and level or the second corresponding relationship between volume and level.

Further, on the basis of any of the above embodiments, the device further includes:

a priority determining module, is used for, when determining that the wake-up delay time is the same as wake-up delay time corresponding to at least one of other intelligent device in the group, judging whether a local priority level is higher than that of the at least one intelligent device respectively, and if the local priority level is highest, determining whether the response information sent by other intelligent device in the group is obtained within the wake-up delay time; and a processing module, is used for, if the local priority level is lower than the at least one intelligent device, ending a delayed response operation.

According to embodiments of the application, the application also provides an intelligent device and a readable storage medium.

Figure 9:
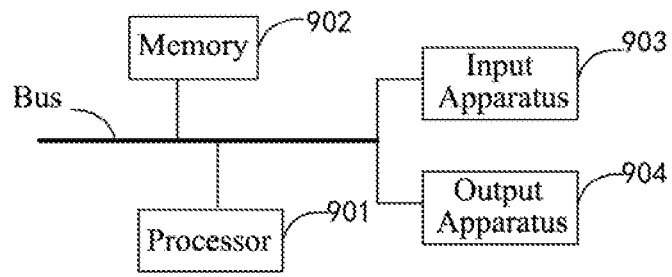
FIG. 9 is a structural diagram of an intelligent device provided in Embodiment V of the present application.

As shown in FIG. 9, it is a block diagram of an intelligent device involved in the intelligent device wake-up method according to the embodiment of the application. The intelligent device is aimed to represent all kinds of human-computer interaction device, such as intelligent speakers, intelligent robots, etc. The components shown herein, their connections and relationships, and their functions are merely examples and are not intended to limit the implementation of the present application described and/or obtained herein.

As shown in FIG. 9, the intelligent device includes: one or more processors 901, a memory 902, and interfaces for connecting various components, including high-speed interfaces and low-speed interfaces. The components are connected to each other via different buses, and can be installed on the public motherboard or in other ways as needed. The processor may process instructions executed within the intelligent device, including instructions that stored in or on the memory to display graphical information of the GUI on an external input/output device (such as a display device coupled to the interface). In other embodiments, multiple processors and/or multiple buses can be used with multiple memories and multiple memories, if desired. Similarly, multiple intelligent devices can be connected, and each device provides some of the necessary operations (for example, as a server array, a group of blade servers, or a multi-processor system). FIG. 9 takes one processor 901 as an example.

The memory 902 is a non-transitory computer-readable storage medium provided by the present application. The memory stores instructions executable by at least one processor, so that the at least one processor executes the intelligent device wake-up method provided in the present application. The non-transitory computer-readable storage medium of the present application stores computer instructions, which are used to cause a computer to execute the intelligent device wake-up method provided by the present application.

As a non-transitory computer readable storage medium, the memory 902 can be used to store non-transitory software programs, non-transitory computer executable programs and modules, such as program instructions/modules corresponding to the wake-up method of the intelligent device in the embodiment of the application (for example, the wake-up voice obtaining module 41, the delay time determining module 42 and the response module 43 shown in FIG. 12). The processor 901 executes various functional applications and data processing of the server by running the non-transitory software programs, instructions, and modules stored in the memory 902, thereby implementing the intelligent device wake-up method in the foregoing method embodiments.

The memory 902 may include a storage program area and a storage data area, where, the storage program area may store an operating system and an application program required by at least one function, the storage data area may store data created according to the use of the intelligent device, and the like. In addition, the memory 902 may include a high-speed random access memory, and may also include a non-transitory memory, such as at least one magnetic disk storage device, a flash memory device, or other non-transitory solid-state storage devices. In some embodiments, in an implementation, the memory 902 may include the memory set remotely relative to processor 901, which can be connected to the intelligent device through a network. Examples of the above network include, but are not limited to, the Internet, an intranet, a local area network, a mobile communication network, and combinations thereof.

The intelligent device involved in the intelligent device wake-up method can also include: an input device 903 and an output device 904. The processor 901, the memory 902, the input device 903 and the output device 904 can be connected by bus or other ways, as shown in FIG. 9.

The input device 903 may receive the input digital or character information, and generate key signal input related to the user settings and function control of the intelligent device involved in the intelligent device wake-up method, such as a touch screen, a keypad, a mouse, a trackpad, a touchpad, an indicator bar, one or more mouse buttons, a trackball, a joystick and other input devices. The output device 904 may include a display device, an auxiliary lighting device (e. g., an LED), a tactile feedback device (e. g., a vibration motor), and the like. The display device may include, but is not limited to, a liquid crystal display (LCD), a light emitting diode (LED) display, and a plasma display. In some implementation manners, the display device may be a touch screen.

Various implementation manners of the systems and techniques described herein may be implemented in digital electronic circuit systems, integrated circuit systems, special ASIC (special integrated circuit), computer hardware, firmware, software, and/or combinations thereof. These various implementation manners may include: manners implemented in one or more computer programs, where the one or more computer programs may be executed and/or interpreted on a programmable system including at least one programmable processor, may be a dedicated or generic programmable processor, may receive data and instructions from a storage system, at least one input device and at least one output device, and transmit data and instructions to the storage system, the at least one input device and the at least one output device.

These computing programs (also known as programs, software, software applications, or codes) include machine instructions of programmable processors, and can be implemented using high-level processes and/or object-oriented programming languages, and/or assembly/machine languages. As used herein, the terms "machine-readable medium" and "computer-readable medium" refer to any computer program product, device, and/or device (e.g., disk, optical disk, memory, programmable logic device (PLD)) used to provide machine instructions and/or data to a programmable processor, and include a machine-readable medium that receives machine instructions as machine-readable signals. The term "machine-readable signal" refers to any signal used to provide machine instructions and/or data to a programmable processor.

In order to provide interaction with the user, the system and technology described herein may be implemented on a computer, and the computer has: a display device for displaying information to the user (for example, a CRT (cathode ray tube) or an LCD (liquid crystal display) monitor); and a keyboard and pointing device (e.g., a mouse or trackball), the user can provide input to the computer through the keyboard and the pointing device. Other kinds of device may also be used to provide interaction with the user; for example, the feedback provided to the user may be any form of sensory feedback (e.g., visual feedback, auditory feedback, or haptic feedback); and may receive the input from the user in any form (including an acoustic input, a voice input, or a tactile input).

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the systems and technologies described herein), or includes such back-end components, middleware components, or any combination of front-end components in a computing system. The components of the system may be interconnected by any form or medium of digital data communication (e.g., a communication network). Examples of communication networks include: local area network (LAN), wide area network (WAN), and the Internet.

A computer system can include a client and a server. The client and server are generally far away from each other and interact through the communication network. The relationship between client and server is generated by computer programs running on corresponding computers and having client server relationship with each other.

Figure 10:
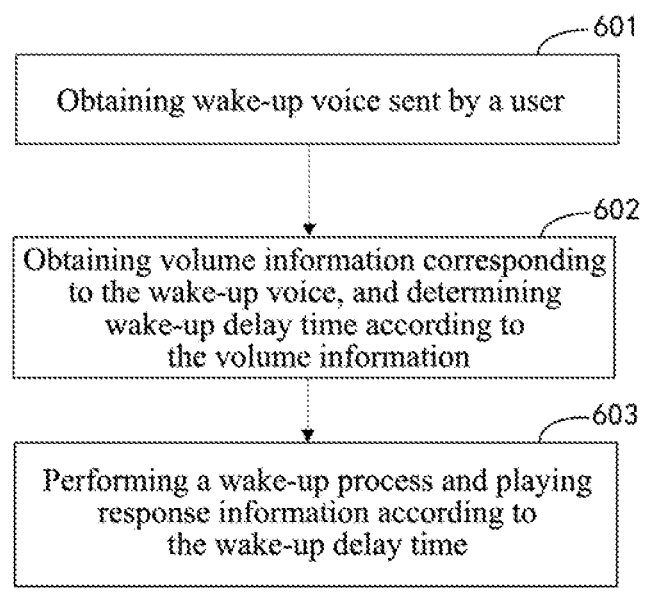
FIG. 10 is a schematic flowchart of an intelligent device wake-up method provided in Embodiment VI of the present application.

FIG. 10 is a schematic flowchart of an intelligent device wake-up method provided in Embodiment VI of the present application, as shown in FIG. 10. The method includes:

Step 601, obtaining wake-up voice sent by a user;

Step 602, obtaining volume information corresponding to the wake-up voice, and determining wake-up delay time according to the volume information;

Step 603, performing a wake-up process and playing the response information according to the wake-up delay time.

The intelligent device wake-up methods, intelligent devices and computer-readable storage mediums provided in embodiments of the present application, determining the corresponding wake-up delay time according to the volume information, and determining whether to respond to the wake-up voice according to the wake-up delay time, can ensure that only one intelligent device responds to the wake-up voice sent out by the user at any time, thereby avoiding the situation that multiple intelligent devices respond at the same time, and improving the user's experience.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The above specific embodiments do not constitute a limitation on the protection scope of the present application.

It should be understood by those skilled in the art, according to design requirements and other factors, various modifications, combinations, sub-combinations, and substitutions can be made. Any modifications, equivalent replacements and improvements made within the spirit and principle of this application shall be included in the protection scope of this application.

What is claimed is:

1. An intelligent device wake-up method, comprising:
   obtaining wake-up voice sent by a user;
   when determining that a current wake-up mode is a group wake-up mode, recognizing volume information corresponding to obtained wake-up voice, and determining wake-up delay time according to the volume information;
   when determining that the wake-up delay time is different from wake-up delay time corresponding to other intelligent device in the group, and no response information sent by other intelligent device in the group is obtained within the wake-up delay time, performing a wake-up process and playing response information when the wake-up delay time is over;
   wherein the method further comprises:
   obtaining a volume level generation request sent by a terminal device, wherein the volume level generation request comprises: a group identifier, quantity information of intelligent device with the group identifier, and an identifier of other intelligent device with the group identifier;
   obtaining volume information corresponding to the identifier of the other intelligent device respectively, according to the volume level generation request; and
   generating a first corresponding relationship between volume and level according to the volume information corresponding to the identifier of the other intelligent device, and the quantity information of the intelligent device with the group identifier.

2. The method according to claim 1, further comprising:
   recognizing voiceprint information corresponding to the obtained wake-up voice;
   wherein the obtaining volume information corresponding to the identifier of the other intelligent device respectively, according to the volume level generation request, comprises:
   obtaining volume information corresponding to the voiceprint information of intelligent device corresponding to the identifier of the other intelligent device respectively, according to the volume level generation request;
   wherein the method further comprises:
   generating a second corresponding relationship between volume and level according to the volume information corresponding to the voiceprint information of the intelligent device corresponding to the identifier of the other intelligent device, and the quantity information of the intelligent device with the group identifier.

3. The method according to claim 1, further comprising:
   sending the first corresponding relationship between volume and level and the second corresponding relationship between volume and level to the intelligent device corresponding to the identifier of the other intelligent device, so that the other intelligent device performs an update process according to the first corresponding relationship between volume and level or the second corresponding relationship between volume and level.

4. The method according to claim 1, wherein the determining wake-up delay time according to the volume information, comprises:
   querying the first corresponding relationship between volume and level according to the volume information, and obtaining the level corresponding to the volume information; and
   determining the wake-up delay time according to the level.

5. The method according to claim 2, further comprising:
   obtaining a second corresponding relationship between volume and level corresponding to the voiceprint information, according to the voiceprint information;
   querying the second corresponding relationship between volume and level according to the volume information, and obtaining the level corresponding to the volume information; and
   determining the wake-up delay time according to the level.

6. The method according to claim 4, wherein, the determining the wake-up delay time according to the level, comprising:
   obtaining the wake-up delay time T according to the level through following formula:

$$T = \text{level} * (K+D)$$

wherein, K represents internal voice processing delay of device, and D represents voice transmission time.

7. The method according to claim 4, wherein, if the level corresponding to the volume is not obtained through querying the first corresponding relationship between volume and level according to the volume information, the method further comprises:
   if it is determined that the volume is lower than a minimum volume, setting the wake-up delay time as a sum of a wake-up delay time corresponding to a level corresponding to the minimum volume and a preset delay time;
   or,
   if it is determined that the volume is higher than a maximum volume, setting the wake-up delay time as a wake-up delay time corresponding to a level corresponding to the maximum volume;
   wherein, the minimum volume is a minimum volume within a volume value range in the first corresponding relationship between volume and level or the second corresponding relationship between volume and level;
   the maximum volume is a maximum volume within a volume value range in the first corresponding relationship between volume and level or the second corresponding relationship between volume and level.

8. The method according to claim 1, further comprising:
   when determining that the wake-up delay time is the same as wake-up delay time corresponding to at least one of other intelligent device in the group, judging whether a local priority level is higher than that of the at least one intelligent device respectively, and if the local priority level is highest, determining whether the response information sent by other intelligent device in the group is obtained within the wake-up delay time;
   if the local priority level is lower than the at least one intelligent device, ending a delayed response operation.

9. An intelligent device, comprising at least one processor;
   and a memory in communication with the at least one processor, wherein, the memory is used for storing instructions that can be executed by the at least one processor to enable the at least one processor to:

obtain wake-up voice sent by a user;

when determining that a current wake-up mode is a group wake-up mode, recognize volume information corresponding to obtained wake-up voice, and determine wake-up delay time according to the volume information; and when determining that the wake-up delay time is different from wake-up delay time corresponding to other intelligent device in the group, and no response information sent by other intelligent device in the group is obtained within the wake-up delay time, perform a wake-up process and playing response information when the wake-up delay time is over;

wherein the at least one processor is further enabled to:

obtain a volume level generation request sent by a terminal device, wherein the volume level generation request comprises: a group identifier, quantity information of intelligent device with the group identifier, and an identifier of other intelligent device with the group identifier;

obtain volume information corresponding to the identifier of the other intelligent device respectively, according to the volume level generation request; and generate a first corresponding relationship between volume and level according to the volume information corresponding to the identifier of the other intelligent device, and the quantity information of the intelligent device with the group identifier.

10. The intelligent device according to claim 9, wherein the at least one processor is further enabled to:

recognize voiceprint information corresponding to obtained wake-up voice;

obtain volume information corresponding to the voiceprint information in the intelligent device corresponding to the identifier of the other intelligent device respectively, according to the volume level generation request;

generate a second corresponding relationship between volume and level according to the volume information corresponding to the voiceprint information of the intelligent device corresponding to the identifier of the other intelligent device, and the quantity information of the intelligent device with the group identifier.

11. The intelligent device according to claim 9, wherein the at least one processor is further enabled to:

send the first corresponding relationship between volume and level and the second corresponding relationship between volume and level to the intelligent device corresponding to the identifier of the other intelligent device, so that the other intelligent device performs an update process according to the first corresponding relationship between volume and level or the second corresponding relationship between volume and level.

12. The intelligent device according to claim 9, wherein the at least one processor is further enabled to:

query the first corresponding relationship between volume and level according to the volume information, and obtain the level corresponding to the volume information; and determine the wake-up delay time according to the level.

13. The intelligent device according to claim 10, wherein the at least one processor is further enabled to:

obtain a second corresponding relationship between volume and level corresponding to the voiceprint information, according to the voiceprint information;

query the second corresponding relationship between volume and level according to the volume information, and obtain the level corresponding to the volume information; and determine the wake-up delay time according to the level.

14. The intelligent device according to claim 12, wherein the at least one processor is further enabled to:

obtain the wake-up delay time T according to the level through following formula:

$$T = \text{level} * (K+D)$$

wherein, K represents internal voice processing delay of a device, and D represents voice transmission time.

15. The intelligent device according to claim 12, wherein, if the level corresponding to the volume is not obtained through querying the first corresponding relationship between volume and level according to the volume information, the at least one processor is further enabled to:

set the wake-up delay time as a sum of a wake-up delay time corresponding to a level corresponding to the minimum volume and a preset delay time if it is determined that the volume is lower than a minimum volume;

or, set the wake-up delay time as a wake-up delay time corresponding to a level corresponding to the maximum volume if it is determined that the volume is higher than a maximum volume;

wherein, the minimum volume is a minimum volume within a volume value range in the first corresponding relationship between volume and level or the second corresponding relationship between volume and level; and the maximum volume is a maximum volume within a volume value range in the first corresponding relationship between volume and level or the second corresponding relationship between volume and level.

16. A non-transient computer-readable storage medium storing computer instructions, wherein, the computer instructions are used for enabling a computer to execute the intelligent device wake-up method according to claim 1.

* * * * *